3,254,714
USE OF MICROEMULSIONS IN MISCIBLE-TYPE OIL RECOVERY PROCEDURE
William B. Gogarty, Littleton, and Russell W. Olson, Denver, Colo., assignors to Marathon Oil Company, Findlay, Ohio, a corporation of Ohio
Filed Nov. 5, 1965, Ser. No. 506,550
10 Claims. (Cl. 166—9)

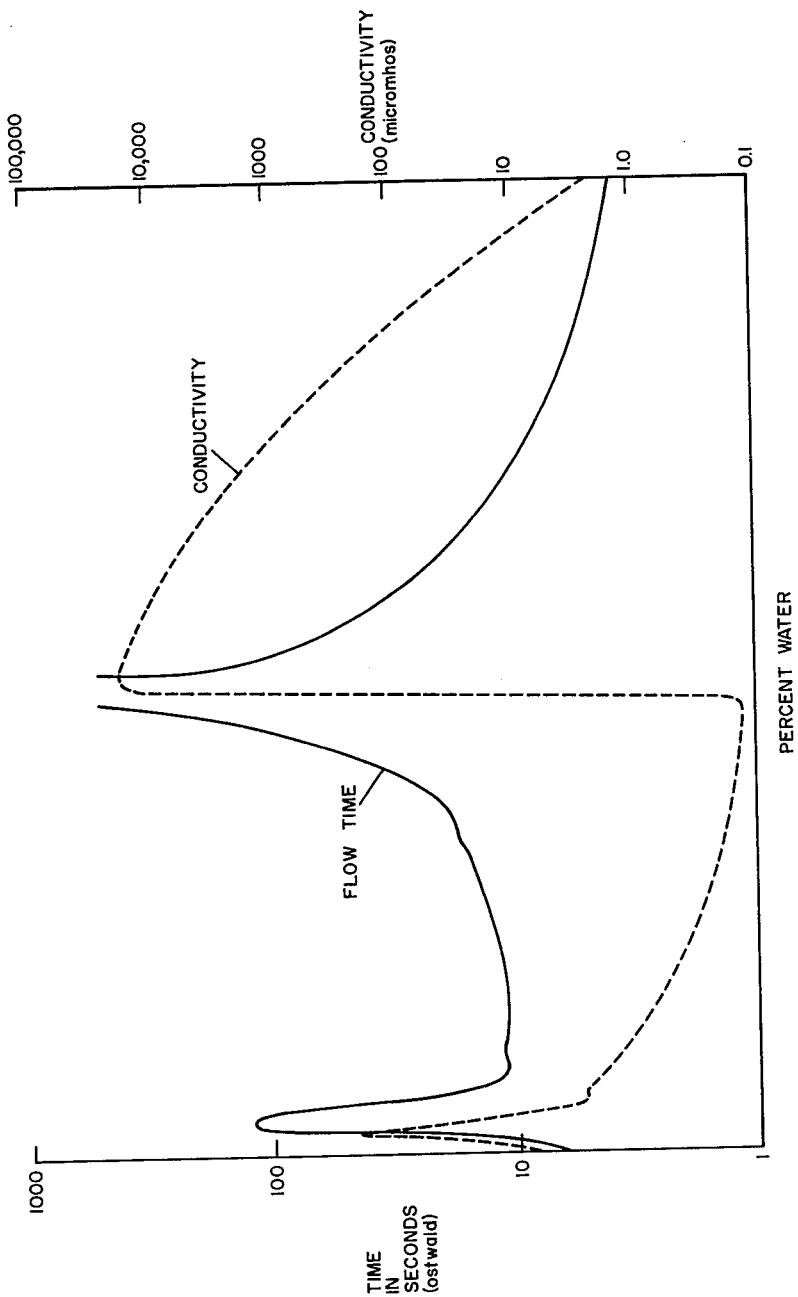

This application is a continuation-in-part of our copending United States patent application Serial No. 212,134, filed July 24, 1962, and Serial No. 324,216, filed November 18, 1963.

This invention relates to the use of improved flooding materials in secondary-type oil recovery operations. More particularly, it relates to the use of microemulsions in such oil recovery operations.

United States Patents 3,082,822 and 3,126,952 teach the use of solutions of surfactants in hydrocarbons in secondary oil recovery. Csaszar, United States Patent 3,163,214, teaches the use of substantially anhydrous soluble oils in secondary-type oil recovery. Nominal amounts of water are contained in some of the systems described in this patent. This solutions of this last patent are diluted with inert nonaqueous solvents to obtain desired viscosities.

Csaszar uses general terms in describing a number of the components of his solutions. Stable systems which were formulated in an attempt to approximate the systems described by this patent reveal that the further addition of water increases their viscosity. This viscosity behavior is also common to the anhydrous "stock" systems to which water was added to formulate the water-containing "soluble oils" described in applicants' Serial No. 212,134 and Serial No. 324,216 and used in completed field tests.

We have discovered that water can be readily substituted for the nonaqueous solvent utilized in the Csaszar patent under certain limited conditions and that the resulting "soluble oils" can be used in secondary and tertiary oil recovery.

This invention is based on the discovery that the phenomena described in the following paragraphs are common to substantially "anhydrous soluble oils" on addition of water. "Anhydrous soluble oils" are defined as quite stable, substantially clear, solutions of surfactants in nonpolar solvents where the surfactant concentration, including the concentration of cosurfactants, is substantially above the critical micelle concentration in the nonpolar solvent. This phenomenon may also be applicable to the liquid crystal system where the surfactant concentration is quite high. When water is incrementally added to the anhydrous soluble oils, assuming a chemical balance (approached by the hydrophile-lyophile balance or other methods) is reached and that the anhydrous soluble oil is compatible with the water, a series of phenomena have been found to occur. The phenomena occurring on initial addition of water will be discussed below in the order of their occurrence.

*First region of water content.*—The micellar system is stable and substantially clear. The viscosity has been found to rise in every instance tested on the incremental addition of water to the system.

*Second region of water content.*—The system is turbid and quite stable. There is usually a continued increase in viscosity on addition of water.

*Third region of water content.*—The system is turbid. The system apparently increases in instability with increasing water content. Generally, the viscosity decreases or levels off.

*Fourth region of water content.*—The systems of this water content are clear and stable. The viscosity of these systems is often relatively low when compared to the high viscosities found at the wet side of the second region of water content and the drier side of the third region of water content.

Continued water addition usually results in other phenomena and a sometimes irregular trend of viscosity with a final increase to a peak associated with an inversion of the system to an oil- in-water opaque or opalescent emulsion. Sometimes there is instability and inversion prior to the occurrence of the large viscosity peak associated with inversion. This latter phenomenon has been noted in systems utilizing light hydrocarbons, such as butane, as the nonpolar external phase.

It is postulated that turbidity occurs in the oil-external systems during water addition as the micellar systems are changing from one or more forms of micelle stable at lower water concentrations to one or more forms stable at higher water concentrations. It should be noted that turbidity and opacity occur when the dispersed phase has a refractive index differing from that of the external phase. Generally, these phenomena would not be seen where the refractive indices were the same. The water concentrations at which the postulated micellar forms change vary with surfactant concentration, the number and type of surfactants, water concentrations, temperatures, salt concentration, etc.

The first viscosity peak normally occurs between about 2 and 15% water concentration while the peak associated with inversion occurs at water concentrations ranging from lower than about 15% to higher than about 40% water.

Differences in the first and second regions of water content and later regions of water content are pointed up by the following phenomena which were found in all systems tested.

(1) The electrical conductivity of the systems on the dry side of this first peak increase to a maximum at a water concentration slightly lower than that causing the viscosity peak and then decreases to a minimum and then rapidly increases at about the water concentration needed to invert the oil-external system to a water-external system. This phenomenon is depicted by the stylized dashed line of the drawing.

(2) Treatment of fluids of region 2 with ultrasonic energy reduces the viscosity of these systems markedly. However, on completion of the treatment, the viscosity rapidly rises to approximately its former level. Conversely, as much as a week is required for the systems of region 3 to regain substantially their intial viscosity after ultrasonic irradiation.

(3) While the ultrasonic wave-induced low viscosity exists, the depressed viscosity system of region 3 will take up water more readily than will the depressed viscosity system on the dry side of the peak.

The fluids utilized in the process of this invention contain an amount of water sufficient to form systems having a nonpolar external (continuous) phase and the properties of the third or higher regions of water content as delineated above. These systems are hereinafter termed "water-containing soluble oils" to differentiate them from the substantially anhydrous soluble oils of the art. Preferably, the fluids utilized in the process of this invention contain at least that amount of water necessary to formulate the systems described under the heading "Fourth Region of Water Content." Generally, these systems are clear but may be turbid—i.e., hazy or cloudy—prior to the opacity occurring on the inversion of these systems through addition of additional water. These preferred systems are referred to hereafter as "microemulsions."

It is apparent that many different components may be utilized in the manufacture of compositions useful in this invention. Further, new surfactants, cosurfactants, etc., are constantly being developed and made commercially available. Many of these components will undoubtedly be found to be adaptable for the preparation of "water-containing soluble oils" and "microemulsions" useful in the present invention. It should be equally obvious that the properties of these systems will vary from those described above. The invention claimed lies in the use of water as an inexpensive diluent rather than the relatively expensive hydrocarbon diluents used in the prior art. To formulate a "water-containing soluble oil" or "microemulsion" useful in applicants' process will call for chemical knowledge and skill, but the duty of the coloid chemist will be like that of an architect who prescribes in the construction of a building the proper materials and the proper dimensions therefor. From his knowledge as a chemist of the materials available, the routine procedures available in this field, and the requisites for such a process, he will know or deduce with confidence their applicability in the preparations of fluids useful in the invention or, otherwise, in the case of novel materials he will know routine tests which will provide reliable data. While it is acknowledged that chemists, using the skill of the art, can formulate systems of sufficient instability or costs to preclude their use in commercial field operations, we may safely assume that no one will wish to make such a useless composition or will be misled because it is impossible to misapply the teachings of this specification in order to do so.

Applicants' invention comprises injecting into a subterranean oil-bearing formation, through at least one injection well drilled therein, relatively stable, substantially transparent "water-containing soluble oils"; driving the said souble oils toward at least one production well drilled into said oil-bearing formation; and recovering petroleum fluids through at least one production well.

The invention is illustrated by further reference to the drawing which also depicts, in stylized form, viscosity behavior observed on the addition of water to stable Csaszar-type solutions or applicants' previously mentioned anhydrous "stock" solutions. It is not intended that this drawing be representative of viscosity behavior for all useful "water-containing soluble oils" as these curves vary with component concentration, surfactant, surfactant concentration, etc. It is seen that, on addition of small amounts of water, the viscosity increases to a first viscosity peak. On addition of still more water, the viscosity decreases. The decrease often ends in a small viscosity peak such as that shown at about 10% water concentration. One or more of such small peaks can be observed on the addition of water to the "soluble oils" found, as depicted, between about 10% and about 33% water concentration. When sufficient water is added, at about 33%—as depicted, this system becomes slightly turbid and finally the viscosity increases to the inversion point at about 50% water concentration.

Microemulsions are made up of a nonpolar external or continuous phase which is preferably a hydrocarbon, a polar internal or discontinuous phase which is preferably water, and at least one surfactant. One or more cosurfactants or cosolvents (cosolubilizers) can also be utilized. "Water-containing soluble oils" and "microemulsions" are, for purposes of this invention, relatively stable and relatively transparent water-in-oil dispersions. Microemulsions have been called "transparent emulsions." One description of some "microemulsions" is found in Schulman and Montagne, Annals of the New York Academy of Sciences, 92, 366–71 (1960). The microemulsions, obviously, will not be transparent if made up of certain crude oils or other components which contain various color bodies as impurities.

The microemulsions used in this process are mobile and stable to the ions and fluids in the formation; i.e., they do not break readily in the presence of these materials. These microemulsions can contain additives to insure optimum operations; for example, corrosion inhibitors can be used in sour fields and bactericides where necessary.

Preferably, microemulsions used in the process of this invention contain, by volume, from about 45 to about 85% hydrocarbons; from about 10 to greater than 40% water; at least about 5% surfactant; and a cosurfactant.

Materials which can be used as the petroleum-base constituents of useful microemulsions include petroleum crudes, for example, a sweet crude from the Illinois Basin; "light ends;" kerosene; octane; and pentane.

Alcohols containing up to about 8 carbon atoms are preferred cosurfactants in the microemulsions of this invention. Ethanol, isopropanol, 2-pentanol, isobutanol, cyclo-hexanol, cresol, and phenol are preferred alcohols. The secondary lower aliphatic alcohols, particularly isopropanol, are the most preferred alcohols for use in the composition of the banks used in the process of this invention. Other solubilizing compounds (cosurfactants) such as lower molecular weight amines and ketones can also be used.

Surfactants which can be used include the various nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate.

We prefer to utilize anionic surfactants such as higher alkylaryl monosulfonates, particularly alkylnaphthenic monosulfonates, wherein the alkyl radical contains from about 10 to 20 carbon atoms. The sodium salts of dialkylsuccinates are also particularly desirable surfactants for use in making up the microemulsions. It is preferred that the alkyl radicals of the succinate compounds contain from about 6 to about 10 carbon atoms.

Microemulsions utilizing chlorinated solvents as the nonpolar phase are preferentially prepared utilizing a nonionic surfactant such as the sodium sulfate derivative of 3,9-diethyltridecanol-6 or the sodium sulfate derivative of 7-ethyl-2-methylundecanol-4. Amine detergents, for example, 1-hydroxyethyl-2-heptadecenyl glyoxalidine, are preferred where the water in the formation is acidic or contains relatively large amounts of calcium or heavy metal ions.

The type of microemulsion and surfactant utilized in the microemulsion depends upon the temperature of the formation and the hardness, including salinity, and pH of the connate water and the water used to make up the microemulsion. It would be futile to use a detergent such as sodium oleate in a formation containing relatively high concentrations of calcium and magnesium ions, as the precipitated calcium and magnesium soaps would plug the formation. Where there is a natural detergent in the crude, a surfactant having a similar ionic charge must be used to avoid precipitating an insoluble reaction product. Preferably, the microemulsion can emulsify large amounts of fresh water and has a low viscosity at the point where the microemulsion inverts to form a water-external emulsion.

Water is the preferred polar solvent and is preferably soft. However, ordinary hard tap water and even relatively brackish waters can be used with detergents which are stable to the contaminating ions. The water utilized can be of a class designed to overcome problems arising out of the water sensitivity of a particular formation. Techniques used in preparing microemulsions are known. The composition is generally prepared by dissolving the surfactant in the nonpolar constituent. However, the surfactant can also be included in the polar constituent. Preferably, the surfactant and cosurfactant are dissolved in a petroleum fluid, and water is added to the petroleum fraction incrementally with agitation.

The amount of slug used increases, though the percent of pore volume decreases, with the volume of reservoir to be swept. Thus, 2.5 to 5.0% of pore volume are adequate to flood a 40–50-acre area, while 5–10% of pore volume are necessary for a 5–10-acre area.

We prefer to inject into the formation a slug of microemulsion bank material of from 1–20% and at least about 3 to about 10% of the pore volume of the formation. Thirty percent, or more, bank material can be utilized. However, such large banks can prove economically unattractive.

It is difficult to define the exact amount of bank material required in this process. Ideally, sufficient bank material should be used to provide a substantially continuous zone of bank material, at the perimeter of the area from which it is desired to recover petroleum crude, between the crude in the formation and the material used to drive the bank. Sometimes it may be more economical to use a small slug, expecting substantial breaks in the bank at the final perimeter, to obtain only a partial recovery of crude rather than to use a large slug and obtain a complete recovery in the swept area. The amount of bank required will also vary with the area to be swept. Crude viscosity, substantial variations in formation permeability, and other considerations also affect the pore volume to be used. Thus, increased amounts of bank material are required where the viscosity of the crude is high in order that the incremental drops in viscosity from the high viscosity at the leading edge to the low viscosity at the trailing edge will be small.

After injection of the bank is completed, a drive material is injected into the formation, usually through the same injection wells, to force the bank material through the formation and the crude ahead of the bank material. Water or thickened water is the preferred drive material. Other drive materials are also useful. Examples of such materials include nitrogen, carbon dioxide, and natural gas.

The following specific examples more fully illustrate our invention, but it is not intended that our invention be limited to the exact petroleum constituents, surfactants, cosolvents, or procedures utilized. Rather, it is intended that all equivalents obvious to those skilled in the art be included within the scope of our invention as claimed.

EXAMPLE I

Microemulsions, as defined above, are prepared from an alkylaryl sulfonate, water, and straight run gasoline. The sulfonate, having an empirical formula approximating $C_nH_{2n-10}SO_3Na$, with $n=25$–$30$ and having a long paraffinic chain attached to an aromatic-naphthenic nucleus, is mixed with the gasoline. The water is then dumped into the container and thereafter rapidly agitated at temperatures of about 30–34° C. Higher temperatures cause some cloudiness and high viscosities. Thus, 400 ml. of a mixture containing 7.4% sulfonate, 49.6% straight run gasoline, and 43% water require about 30 minutes to become transparent with vigorous agitation.

EXAMPLE II

Four floods are performed in an unconsolidated sand packed (Blackhawk E Sand) into 10′ x 0.5″ pipe. The pack has a porosity of 37.7% and a permeability of 10 d. In each test, the sand pack is prepared in the same manner with Illinois water. Hughes crude is injected into the sand pack as the oil phase, and air is injected as the gas phase. The various slugs are followed by fresh water at a constant injection rate of 36.7 cc./hr.

Various floods and slugs are utilized in a series of experiments set out in the table below. A slug is made up of 24% water, 3.8% isopropanol, 11.6% alkylaryl naphthenic sulfonate, and 60.6% straight run gasoline. The slug should have a viscosity of about 11 cp. A 40% water content, nonalcoholic microemulsion is made up of 40% water, 44% straight run gasoline, and 16% sulfonate. The nonalcoholic microemulsion should have a viscosity of about 15 cp. An emulsion containing 60% water, 2% isopropanol, and 38% of a straight run gasoline-alkylnaphthenic sulfonate mixture in a ratio of 84:16. The emulsion should have a viscosity of about 11 cp.

Comparable results are obtained with the nonalcoholic transparent emulsion only when the slug is tapered with a second slug of 12% pore volume of a water external, 60% emulsion containing alcohol.

*Displacement efficiencies of alcoholic and nonalcoholic systems*

| Pore Volumes to be Injected | Straight Slug 12% PV 24% H₂O (alcoholic) | Straight Slug 12% PV 40% H₂O (nonalcoholic) | Tapered Slug 12% PV 6% of 40% H₂O 6% of 60% H₂O | Tapered Slug 24% PV 12% of 40% H₂O 13% of 60% H₂O |
|---|---|---|---|---|
| *Miscible Slug Secondary Oil Recovery—Percent of Original Oil in Place* ||||
| ½ | 34.4 | 25.8 | 27.9 | 25.0 |
| 1 | 83.6 | 69.3 | 75.4 | 81.7 |
| 1½ | 93.4 | 80.7 | 85.3 | 93.3 |
| *Initial Fluid Saturations—Percent of Pore Volume* ||||
| Water Sat | 15.1 | 14.2 | 14.2 | 15.1 |
| Oil Sat | 57.5 | 58.4 | 57.5 | 56.6 |
| Air Sat | 27.4 | 27.4 | 28.3 | 28.3 |

EXAMPLE III

A pentane slug containing 3.4% isopropanol, 33% water, 51.0% pentane, and 12.6% commercial alkylnaphthenic monosulfonate can be found to yield the following results when compared with a regular water flood in a sand pack such as that of Example II. Water is the drive material.

*Secondary oil recovery percent of original oil in place (with 33% water content microemulsion)*

| Pore Volumes to be Injected | 20% PV Slug Size | 12% PV Slug Size | 6% PV Slug Size | Regular Waterflood |
|---|---|---|---|---|
| ½ | 38.4 | 37.7 | 31.6 | |
| 1 | 90.0 | 90.2 | 51.7 | 57.0 |

EXAMPLE IV

A pentane slug containing 1.6% isopropanol, 68% water, 24.5% pentane, and 6.1% alkylnaphthenic monosulfonate gives the following recovery efficiency when tested in the unconsolidated sand pack of Examples II and III. Again, water is the drive material.

*Secondary oil recovery percent of original oil in place (with 68% water-external emulsion)*

| Pore Volumes to be Injected | 24% PV Slug Size | 12% PV Slug Size |
|---|---|---|
| ½ | 20.4 | 15.3 |
| 1 | 83.1 | 54.3 |

Now having described our invention, what we claim is:

1. In a process for the recovery of crude petroleum fluids from permeable subterranean formations having at least one injection means and one recovery means in fluid communication with said subterranean formation, the steps comprising injecting through at least one injection means a water-containing soluble oil, displacing said water-containing soluble oil toward at least one recovery means, and recovering substantial displaced crude petroleum fluids through said at least one recovery means.

2. The process of claim 1 wherein the water-containing soluble oil is a microemulsion.

3. The process of claim 2 wherein the microemulsion contains from about 10 to about 20% water as a dispersed phase.

4. The process of claim 2 wherein the volume of microemulsion injected into the formation comprises from about 1 to about 20% of the pore volume of the formation being flooded.

5. The process of claim 2 wherein the volume of microemulsion injected into the formation comprises at least about 3 to about 10% of the pore volume being flooded.

6. The process of claim 2 wherein the microemulsion contains an at least partially oil-soluble sulfonate surfactant.

7. The process comprising injecting into a permeable crude oil-containing subterranean formation having at least one injection well and at least one recovery well in communication therewith, the process comprising injecting into said formation through said at least one injection well a microemulsion containing at least about 10% water as the dispersed phase, thereafter injecting into said formation through said injection well water to displace said microemulsion toward at least one recovery well, and recovering substantial displaced crude petroleum fluids through said at least one recovery well.

8. The process of claim 7 wherein the volume of microemulsion injected into the formation comprises from about 1 to about 20% of the pore volume of the formation being flooded.

9. The process of claim 7 wherein the volume of microemulsion injected into the formation comprises at least about 3 to about 10% of the pore volume being flooded.

10. The process of claim 7 wherein the microemulsion contains an at least partially oil-soluble sulfonate surfactant.

References Cited by the Examiner

UNITED STATES PATENTS 3,163,214  12/1964  Csaszar _____ 166—9

JACOB L. NACKENOFF, *Primary Examiner.*

S. J. NOVOSAD, *Assistant Examiner.*